(12) United States Patent
Mallya et al.

(10) Patent No.: US 11,200,325 B2
(45) Date of Patent: Dec. 14, 2021

(54) DYNAMIC DATA ASSET SECURITY USING COGNITIVE DATA ANALYSIS

(71) Applicant: International Business Machines Corporation, Armonk, NY (US)

(72) Inventors: Shailaja Mallya, Bangalore (IN); Nayna Jain, Bangalore (IN); Divya K. Konoor, Bangalore (IN); Pavitra Maras, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 762 days.

(21) Appl. No.: 15/948,826

(22) Filed: Apr. 9, 2018

(65) Prior Publication Data
US 2019/0311137 A1    Oct. 10, 2019

(51) Int. Cl.
*G06F 21/60* (2013.01)
*G06N 20/00* (2019.01)

(52) U.S. Cl.
CPC .......... *G06F 21/602* (2013.01); *G06F 21/604* (2013.01); *G06N 20/00* (2019.01)

(58) Field of Classification Search
CPC ...... G06F 21/602; G06F 21/604; G06N 20/00
USPC ......................................................... 713/193
See application file for complete search history.

(56) References Cited

U.S. PATENT DOCUMENTS

| | | | |
|---|---|---|---|
| 8,266,670 B1* | 9/2012 | Merkow | H04L 67/1002 726/1 |
| 9,038,193 B2 | 5/2015 | Burgess et al. | |
| 10,110,600 B1* | 10/2018 | Simca | H04L 63/08 |
| 2008/0052328 A1* | 2/2008 | Widhelm | H04L 63/1408 |
| 2013/0006868 A1* | 1/2013 | Hawkes | G06Q 40/08 705/51 |
| 2014/0068706 A1* | 3/2014 | Aissi | G06F 21/6254 726/1 |
| 2014/0070947 A1* | 3/2014 | Ionson | G08B 31/00 340/541 |
| 2015/0120359 A1* | 4/2015 | Dongieux | G06F 16/285 705/7.15 |
| 2015/0213369 A1* | 7/2015 | Brandt | G06N 20/00 706/12 |
| 2015/0304169 A1* | 10/2015 | Milman | H04L 63/0209 709/220 |
| 2016/0371489 A1* | 12/2016 | Puri | G06F 16/254 |
| 2017/0048268 A1* | 2/2017 | Rieke | H04L 63/02 |
| 2018/0349615 A1* | 12/2018 | Chan | G06F 21/577 |
| 2018/0351999 A1* | 12/2018 | Barday | H04L 63/04 |
| 2019/0182289 A1* | 6/2019 | White | G06Q 10/0635 |
| 2020/0322387 A1* | 10/2020 | Brannon | H04L 63/20 |
| 2021/0141932 A1* | 5/2021 | Barday | G06F 16/125 |

FOREIGN PATENT DOCUMENTS

CN        106909851 A      6/2017

* cited by examiner

*Primary Examiner* — Dereena T Cattungal
(74) *Attorney, Agent, or Firm* — Patterson + Sheridan, LLP (57) ABSTRACT

Embodiments disclosed herein identify a first data asset that is associated with a non-optimized security configuration, based at least in part on metadata associated with the first data asset. Additionally, an optimized security configuration is generated for the first data asset by processing the metadata associated with the first data asset using one or more machine learning models. Furthermore, the optimized security configuration is applied to the first data asset.

20 Claims, 8 Drawing Sheets

DYNAMIC DATA ASSET SECURITY USING COGNITIVE DATA ANALYSIS

BACKGROUND

The present disclosure relates to computer security, and more specifically, to implementing dynamic security configurations utilizing cognitive analysis of metadata.

Data security is an important aspect of modern computing systems. Different data often requires distinct security configurations to reflect the sensitivity of the particular data. Further, in addition to stored data, data in transit (e.g., passing through a computing system) is also subject to risk and must therefore be protected by some sort of security. In modern computing systems, there are a huge number of security options and settings that are available. For example, data can be encrypted according to any number of different standards. Different methods of encryption frequently impose differing requirements and computing costs, and also provide different levels of protection.

Using existing approaches, determining the appropriate security configuration for data is a tedious and error-prone process. If the selected security is too light, the data may be vulnerable to attack or may become compromised. Beyond potentially harming the computing system, this can cause significant harm to people, companies, and organizations that depend on the data remaining secure. Furthermore, if the selected security is stronger than it needs to be considering the importance of the data, computing systems resources are wasted protecting data that need not be so carefully guarded. Additionally, newly created data and data in transit through a system are often associated with a default standard of security unless the user or administrator manually adjusts the configuration, which is potentially wasteful and dangerous.

SUMMARY

According to one embodiment of the present disclosure, a computer program product comprising a computer-readable storage medium having computer-readable program code embodied therewith is disclosed. The computer-readable program code is executable by one or more computer processors to perform an operation including identifying a first data asset as a candidate for a revised security configuration. The operation further includes determining that the first data asset is associated with a non-optimized security configuration based at least in part on metadata associated with the first data asset, where the non-optimized security configuration includes a first level of encryption. Further, an optimized security configuration is generated for the first data asset by processing the metadata associated with the first data asset using one or more machine learning models, where the optimized security configuration includes a second level of encryption. The operation additional includes applying the optimized security configuration to the first data asset by encrypting the first data asset according to the second level of encryption, and processing the first data asset in accordance with the optimized security configuration.

According to a second embodiment disclosed herein, a system including a processor and a memory storing one or more instructions is disclosed. When executed by the processor, the one or more instructions perform an operation including identifying a first data asset as a candidate for a revised security configuration. The operation additionally includes determining that the first data asset is associated with a non-optimized security configuration based at least in part on metadata associated with the first data asset, where the non-optimized security configuration includes a first set of access control settings. Further, an optimized security configuration is generated for the first data asset by processing the metadata associated with the first data asset using one or more machine learning models, where the optimized security configuration includes a second set of access control settings. The operation additionally includes applying the optimized security configuration to the first data asset by associating the first data asset with the second set of access control settings and processing the first data asset in accordance with the optimized security configuration.

According to a third embodiment of the present disclosure, a method is disclosed. The method includes identifying a first data asset that is associated with a non-optimized security configuration, based at least in part on metadata associated with the first data asset. The method further includes generating an optimized security configuration for the first data asset by processing the metadata associated with the first data asset using one or more machine learning models, and applying the optimized security configuration to the first data asset.

DETAILED DESCRIPTION

Modern computing systems often store and process large amounts of data or data assets. As used herein, a data asset is any piece or collection of data. A data asset may be stored on, processed by, or transiting through a computing system. For example, a data asset may be a database storing data, a particular table or row in a database, or the actual data itself stored in the database. Similarly, in various embodiments, a data asset may be a document, file, application, webpage, or record. Data assets must generally be protected by some level of security, which may vary based on the content of the data asset. That is, the required level of security may depend at least partially on how confidential or important the data is. For example, in a healthcare setting, a patient's social security number will likely require a relatively high level of security, while the name of the treating physician likely requires a relatively low level of protection.

In addition to the content of a data asset (e.g., whether the data asset includes a social security number or merely a phone number), embodiments of the present disclosure enable a cognitive module to consider attributes of the data asset (e.g., metadata associated with the data asset). For example, in an embodiment, the location of the data asset in the file system or the channels that it transits may affect the level of security required. Similarly, in one embodiment, the lifetime of the data asset can affect the level of security it requires. That is, if a data asset is only required to remain confidential for a brief period of time (because, for example, it will be destroyed or publicly released after a relatively short period of time), the required level of security may be relatively lower than if the data asset had an indefinite lifetime (e.g., if it required protection ad infinitum with no defined end of life). That is, if the data asset will only be kept secret for a brief period of time, it is subject to less risk than a data asset that must remain protected for a long period of time. Thus, in one embodiment, the data asset will be assigned a security level (e.g., level of encryption) which ensures the data is secure for the data asset's lifetime, without unnecessarily wasting resources (e.g., by selecting an encryption which is stronger than needed, given the brief lifetime of the data).

One embodiment of the present disclosure involves using a cognitive module to dynamically assign security configurations to data assets based at least in part on metadata associated with each data asset. In this way, embodiments of the present disclosure improve the functioning of computing systems by reducing or eliminating resource usage that is unnecessary and providing increased security when it is required. Computing resources are more optimally allocated because resources are not wasted providing higher security than is required based on the attributes (as opposed to the content) of the data asset. Similarly, computer security is improved because the attributes of each data asset are considered to ensure that each asset is not vulnerable because of a security configuration that is lower than required.

Figure 1:
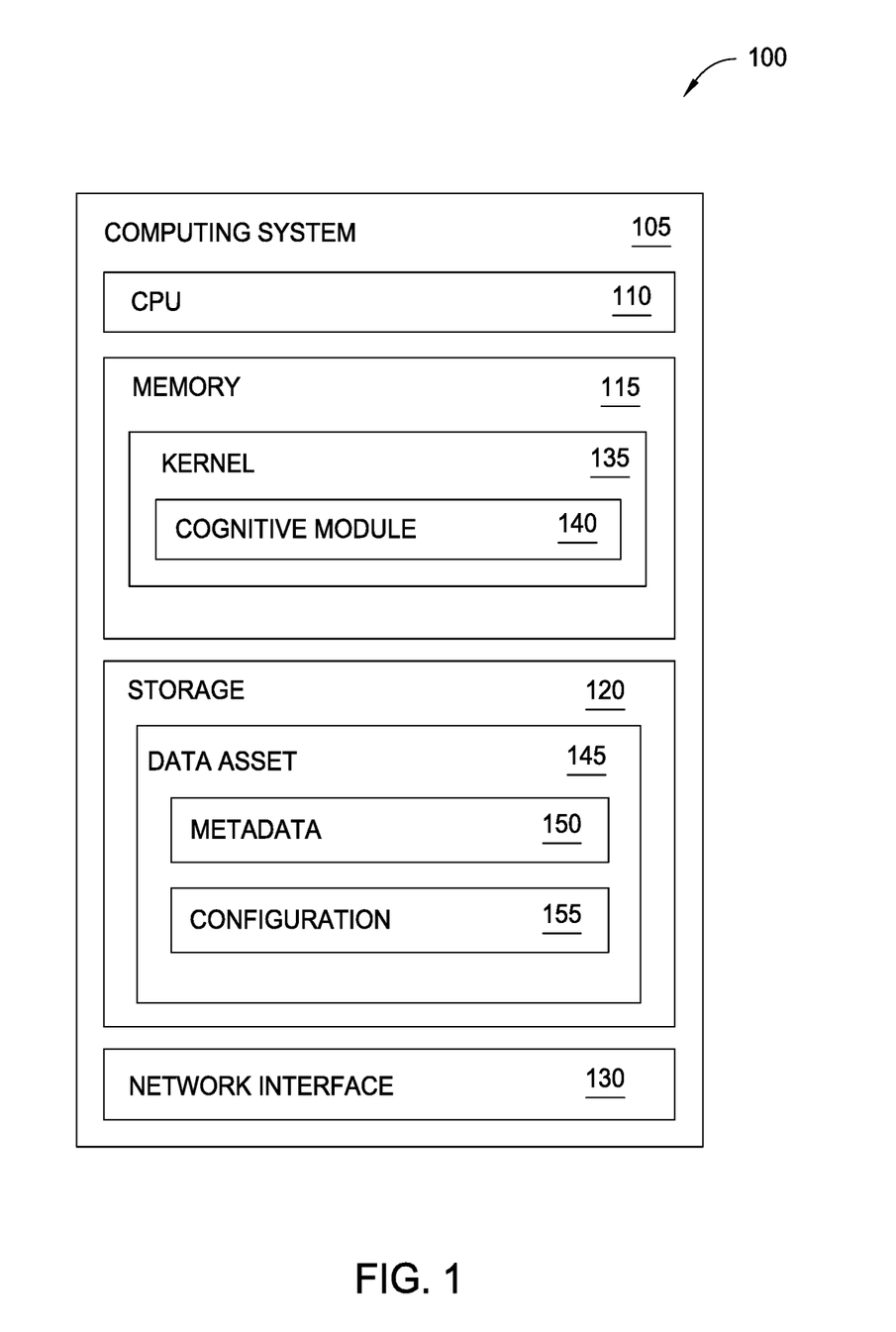
FIG. 1 is a block diagram of a computing system capable of implementing dynamic security, according to one embodiment described herein.

With reference now to FIG. 1, a block diagram of a Computing System 105 capable of implementing dynamic security, according to one embodiment described herein, is illustrated. As illustrated, Computing System 105 contains CPU 110, Memory 115, Storage 120, and Network Interface 130. In the illustrated embodiment, CPU 110 retrieves and executes programming instructions stored in Memory 115 as well as stores and retrieves application data residing in Storage 120. CPU 110 is representative of a single CPU, multiple CPUs, a single CPU having multiple processing cores, and the like. Memory 115 is generally included to be representative of a random access memory. Storage 120 may be a disk drive or flash-based storage device, and may include fixed and/or removable storage devices, such as fixed disk drives, removable memory cards, or optical storage, network attached storage (NAS), or storage area-network (SAN). Although not depicted, in various embodiments Computing System 105 may also include one or more input or output (I/O) devices such as a keyboard, mouse, display, and the like.

As illustrated, Memory 115 includes a Kernel 135. In an embodiment, Kernel 135 is a kernel of an operating system. In the illustrated embodiment, the Kernel 135 is a program that forms the core of the operating system, maintains complete control over the components of the Computing System 105, and has access to all data on the Computing System 105. In some embodiments, a single physical computing system may include multiple virtual computing systems (e.g., virtual machines or other logical partitions), each of which may include its own Kernel 135. In the illustrated embodiment, Cognitive Module 140 is included as a part of the Kernel 135. In an embodiment, the Cognitive Module 140 can similarly access all data assets on the Computing System 105.

Although Kernel 135 is illustrated as included within Memory 115, in other embodiments it may of course operate in other locations or memory devices, or may be included as a hardware module. Similarly, although Cognitive Module 140 is depicted as a component of the Kernel 135, it may of course be implemented in various other hardware or software components in other embodiments. In the illustrated embodiment, the Storage 120 includes a Data Asset 145. Of course, in practice the Storage 120 will likely include many Data Assets 145, each of which contains different information and attributes, and each of which requires differing security configurations. Additionally, in embodiments, Data Assets 145 may also be included within Memory 115 and elsewhere on Computing System 105. Similarly, Data Assets 145 can be transiting through Computing System 105 or only briefly present on the Computing System 105. As discussed above, each Data Asset 145 is data that is stored, processed, received, or transmitted by the Computing System 105.

The illustrated Data Asset 145 includes Metadata 150 and a Security Configuration 155. Although not illustrated, in an embodiment the Data Asset 145 additionally includes the data itself (e.g., the contents of the Data Asset 145 like a social security number, patient history, etc.). The Metadata 150 generally includes attributes of the Data Asset 145. For example, in one embodiment, the Metadata 150 includes an indication of the lifetime of the Data Asset 145. In one embodiment, the lifetime of the Data Asset 145 refers to how long the Data Asset 145 must remain confidential or protected. For example, in one embodiment the Data Asset 145 lifetime refers to when it will be destroyed or no longer remains on the Computing System 105. In a related embodiment, the lifetime is affected by a time at which the Data Asset 145 will be publicly released or otherwise available. In some embodiments, the lifetime of a Data Asset 145 refers to a point when the Data Asset 145 can be treated with lowered security, as opposed to no security.

In an embodiment, the Metadata 150 may include an indication of the lifetime of the Data Asset 145 in the form of a predefined period of time, during which the Data Asset 145 is subject to particular security requirements (e.g., heightened security requirements). After such a predefined period of time elapses, the Data Asset 145 may be subject to other security requirements (e.g., reduced security requirements). In a related embodiment, when the period of time has elapsed, the Data Asset 145 may remain with the same security requirements, or may be reevaluated to determine whether reduced or enhanced security is required. In one embodiment, the period of time is an indication of the amount of time starting from when the Data Asset 145 was created or otherwise entered the Computing System 105. For example, in such an embodiment, the Metadata 150 may indicate that the Data Asset 145 must remain confidential for a defined number of hours, minutes, seconds, or portions of a second. In another embodiment, the period of time is represented by a clock or timer, and the time elapses when the timer reaches zero. In some embodiments, the lifetime of the Data Asset 145 is determined based on a predefined time and/or date at which the security configuration of the Data Asset 145 should be updated. For example, in such an embodiment, the Metadata 150 may indicate that the Data Asset 145 must remain protected until a particular date or time.

In one embodiment, the Metadata 150 includes an indication or reference of where the Data Asset 145 currently resides (e.g., where in Memory 115 or Storage 120 it is currently stored). In related embodiments, the Metadata 150 may also include an indication as to where the Data Asset 145 has been stored in the past, and where it will be stored at some moment in the future. In some embodiments, this information is stored in terms of a hardware address, logical address, or both. In an embodiment, the Metadata 150 indicates where in the file structure the Data Asset 145 resides, has resided, or will reside (i.e., which directory or domain the Data Asset 145 resides in). In some embodiments, the Cognitive Module 140 knows the file structure of the Computing System 105, and can thereby determine the amount of protection that is required based on the storage location of the Data Asset 145, as will be discussed in more detail below.

As illustrated, the Data Asset 145 also includes a Security Configuration 155. In an embodiment, the Security Configuration 155 includes the security settings and options that are to be applied when storing, transmitting, or processing the Data Asset 145. For example, the Security Configuration 155 may include a level of encryption (e.g., a reference to an encryption algorithm). In another embodiment, the Security Configuration 155 includes access control information, which defines users and processes that can and cannot access the Data Asset 145. In embodiments, the access control may take the form of a whitelist (i.e., a list of users or applications that are allowed access), a blacklist (i.e., a list of users or applications that are not allowed access), or a combination of both. Similarly, in an embodiment, the Security Configuration 155 defines what level of access each user or process has (e.g., read-only permissions, read/write permissions, execution permissions, and the like).

As will be discussed in more detail below, the Cognitive Module 140 generally analyzes the Metadata 150 in order to generate an optimal Security Configuration 155 that is tailored to the attributes of the particular Data Asset 145. This Security Configuration 155 is then assigned, associated with, or applied to the Data Asset 145 to ensure appropriate security is maintained. In an embodiment, the Cognitive Module 140 processes each Data Asset 145 when it is created or arrives on the Computing System 105. In some embodiments, the Cognitive Module 140 may periodically scan Data Assets 145 on the Computing System 105 to ensure that the content or attributes have not changed in a way that requires an updated Security Configuration 155. In some embodiments, the Cognitive Module 140 only analyzes Data Assets 145 that have changed since the last scan rather than processing every Data Asset 145. In one embodiment, a Data Asset 145 has "changed" if the content of the Data Asset 145 has changed. In another embodiment, the Data Asset 145 has "changed" if the Metadata 150 has changed (e.g., the lifetime has changed, the Data Asset 145 is stored in a new location, etc.). In one embodiment, whether the Data Asset 145 has changed is indicated by the associated Metadata 150.

Additionally, in some embodiments, the Cognitive Module 140 may analyze the Metadata 150 of each Data Asset 145 when some system parameter or structure changes. For example, if a new row is added in a database, a new storage drive or communications pathway is added, the file structure is changed or the permissions attached to a portion of the file structure has been updated, and the like. As will be discussed in more detail below, in various embodiments the Cognitive Module 140 may also be trained regarding the costs of each security option, the length of time a brute force attack requires to compromise each level of encryption, new attacks or exploits that are discovered, and the like.

Figure 2:
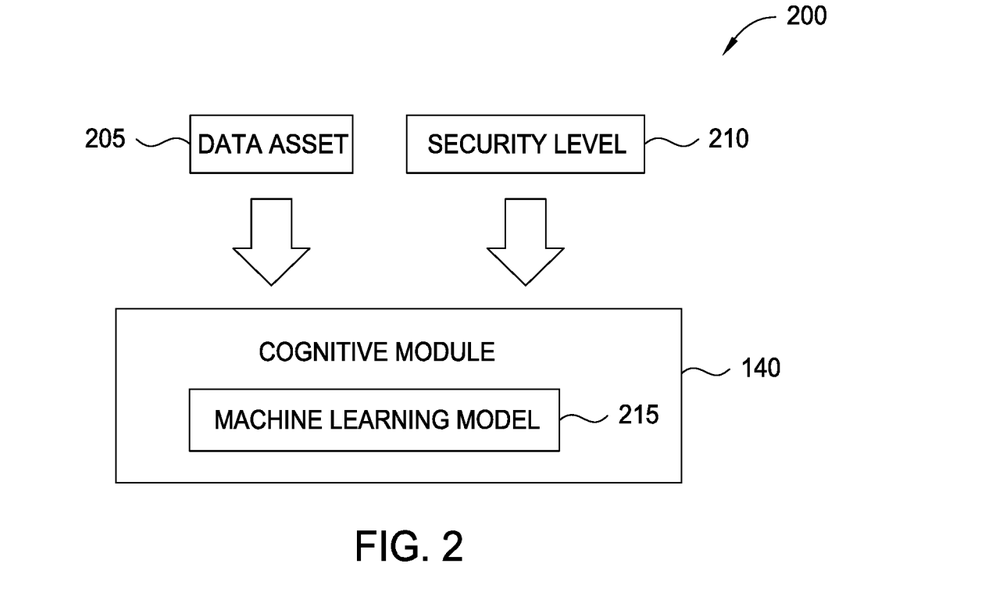
FIG. 2 illustrates a method of training a cognitive module to provide dynamic security, according to one embodiment described herein.

FIG. 2 illustrates a method 200 of training a Cognitive Module 140 to provide dynamic security, according to one embodiment described herein. In the illustrated embodiment, the Cognitive Module 140 includes a Machine Learning Model 215. In some embodiments, this is a supervised machine learning model that is trained by providing labeled training data. In the illustrated embodiment, the training data includes a number of Data Assets 205, each of which is labeled with a Security Level 210. In the illustrated embodiment, the Security Level 210 is determined based on the content of the Data Asset 205, and can range from low to high. There may be any number of levels in between the lowest and highest levels. For example, in one embodiment, a user's bank account number could be assigned the highest security level, while the name of the bank could be assigned a lower security level.

In the illustrated embodiment, each Data Asset 205 used to train the Cognitive Module is assigned a Security Level 210 by a user or administrator. In a related embodiment, the Security Level 210 is assigned to the Data Asset 205 by the Computing System 105 based on how it is classified or labeled by the user when it is entered and stored (i.e., when the data is recorded as a "social security number," it is assigned the highest security). In the illustrated embodiment, the Cognitive Module 140 receives this labeled training data and trains Machine Learning Model 215. That is, the Machine Learning Model 215 is trained to analyze the content of the Data Asset 205 and assign it a Security Level 210. In this way, the Cognitive Module 140 need not consider how the data was labeled or entered by a user in order to determine the appropriate level of security. Thus, after being trained, the Cognitive Module can analyze and classify existing data, new data being created, and data in transit and assign an appropriate Security Level 210.

In one embodiment, the data used to train the Cognitive Module 140 originates from the appropriate industry or setting. For example, if the Computing System 105 is to operate in a financial setting, finance data should be used to train the Cognitive Module 140. Similarly, if the Computing System 105 is part of a healthcare industry, the Data Assets 205 used to train the Cognitive Module 140 should include healthcare data. Thus, the Cognitive Module 140 is trained to assign Security Levels 210 to each Data Asset 205 in a way that reflects the realities of the system or industry for which it will be used in operation.

Figure 3:
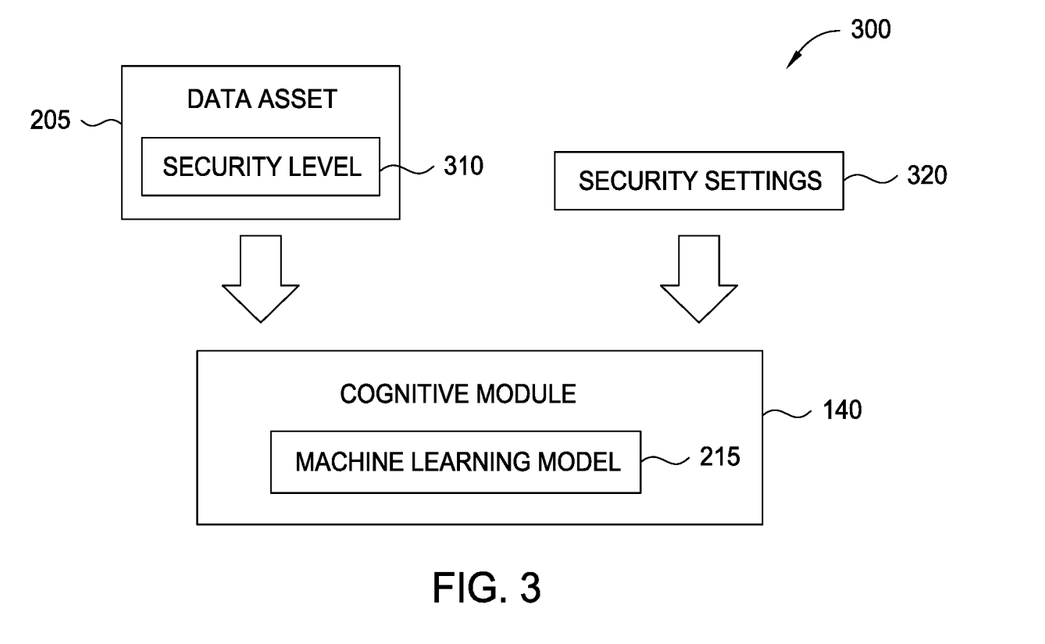
FIG. 3 illustrates a method of training a cognitive module to provide dynamic security, according to one embodiment described herein.

FIG. 3 illustrates a method 300 of training a Cognitive Module 140 to provide dynamic security, according to one embodiment described herein. In one embodiment, the method 300 is used after the Cognitive Module 140 has been trained according to the method 200. In other embodiments, the methods 200 and 300 may be implemented simultaneously or in reverse order, or the Cognitive Module 140 may only be trained according to the method 300. In the illustrated embodiment, the Cognitive Module 140 is trained on the Security Settings 320 that are available on the Computing System 105, as well as which Security Settings 320 apply to each Security Level 310. As before, in an embodiment, this training is accomplished by providing the Cognitive Module 140 with Data Assets 205 that are already labeled with the appropriate Security Level 310, as well as the corresponding Security Settings 320. Additionally, in some embodiments, the Cognitive Model 140 is taught how to actually adjust the Security Settings 320 (e.g., which operations or commands to issue).

Once this training in method 300 has been completed, the Cognitive Module 140 is configured to dynamically assign Security Settings 320 to Data Assets 205 based on the associated Security Level 310. For example, the Cognitive Module 140 may assign a particular encryption method or access control setting to the Data Asset 205 based on whether it is classified as a "low level" security, "high level" security, or any level in between. Additionally, as discussed above, in some embodiments, the Cognitive Module 140 is also trained to generate an optimal Security Level 310. Thus, in some embodiments, the Cognitive Module 140 can receive and process new and existing Data Assets 205 to determine the appropriate level of security (which may have changed if the Data Asset 205 or the Computing System 105 has changed), as well as the particular Security Settings 320 to apply.

Figure 4:
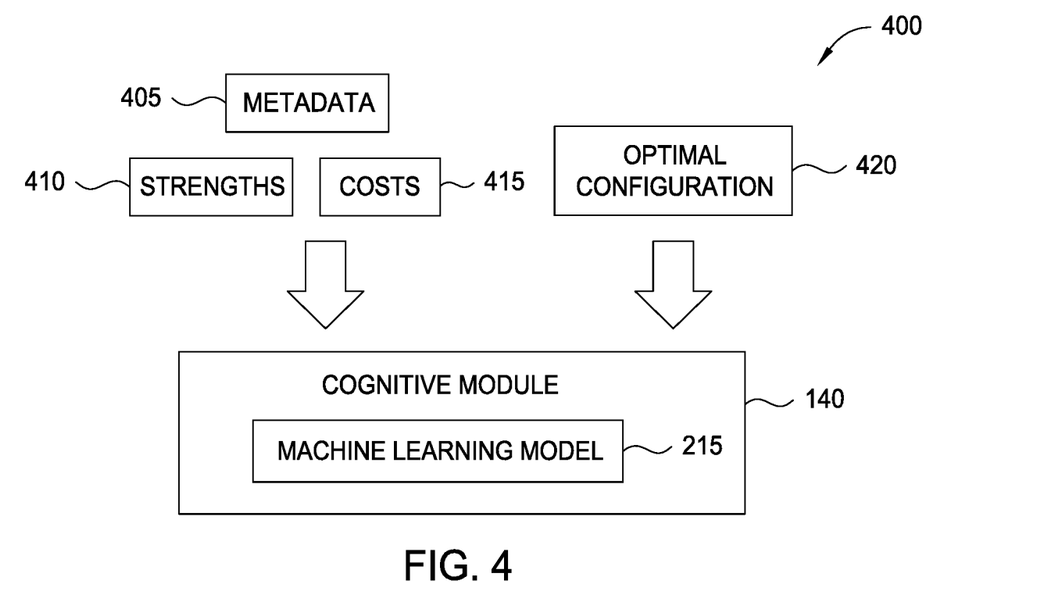
FIG. 4 illustrates a method of training a cognitive module to provide dynamic security, according to one embodiment described herein.

FIG. 4 illustrates a method 400 of training a Cognitive Module 140 to provide dynamic security, according to one embodiment described herein. In the illustrated embodiment, the Cognitive Module 140 is supplied with Metadata 405 about each data asset, as well as an Optimal Security Configuration 420 for data asset. Similarly, in the illustrated embodiment, the Cognitive Module 140 is trained regarding the Costs 415 of the various security options, and the Strengths 410 of each security option, as will be discussed in more detail below.

As discussed above, the Metadata 405 includes attributes of the associated Data Asset 145, such as the lifetime of the Data Asset 145. In one embodiment, the Cognitive Module 140 trains one or more machine learning models (such as Machine Learning Model 215) using this Metadata 405 such that the Cognitive Module 140 can process other unlabeled Data Assets 145 to determine the lifetime of the respective Data Asset 145. In some embodiments, the lifetime of each Data Asset 145 may be determined by a user or administrator, based on the labels the data is assigned, based on its storage location, and the like, in addition to or in the alternative to utilizing the Cognitive Module 140 to provide this lifetime Metadata 405.

In one embodiment, the Optimal Security Configuration 420 is based at least in part on the lifetime of the Data Asset 145. For example, if a news article is set to be published the following day, it need only remain confidential and protected until that time. In such an embodiment, the Optimal Security Configuration 420 may include a level of encryption that ensure the Data Asset 145 cannot be compromised before that time (e.g., by a brute force attack), without being so strong that it will waste computing resources by using stronger encryption than is required. For example, an encryption algorithm that takes years to be compromised would consume more resources than are required for an asset that will be made public within a week. In an embodiment, when the assigned or determined lifetime of the Data Asset 145 is approaching (or has passed), the Cognitive Module 140 may determine whether an extension is warranted. That is, if the Data Asset 145 still requires protections (e.g., it has not yet been released or deleted), the Cognitive Module 140 may assign a stronger Security Configuration 420.

In one embodiment, the Metadata 405 also includes a location where the Data Asset 145 is stored. By training using this data and the Optimal Security Configuration 420, the Cognitive Module 140 can learn to provide appropriate access control settings and encryption to other future Data Assets 145 based on the Metadata 405 (e.g., where in the file system the asset is stored). For example, HTML formatted Data Assets 145 are likely webpages that will be hosted on a website. If the folder under which the Data Asset 145 is associated with authentication requirements, higher encryption standards may be appropriate. Similarly, if the folder is publically available, a minimal or no encryption may be more suitable. As an additional example, a network file system (NFS) file that can be remotely mounted to other systems may not require high encryption standards if all systems in a data center have access to it, and would likely require only protections against traffic sniffers. In some embodiments, based on the storage location, the Cognitive Module 140 can also be trained to determine the appropriate access control settings.

In some embodiments, the Cognitive Module 140 is also trained as to the Costs 415 of each security setting. For example, a particular security option may take a minimum amount of time to deploy. Similarly, some security options may consume additional memory or processor resources, which may detrimentally affect the Computing System 105. In an embodiment, by allowing the Cognitive Module 140 to understand the Costs 415 of each security option (e.g., of each encryption algorithm), the Cognitive Module 140 can generate a security configuration with the minimum impact on the Computing System 105.

In the illustrated embodiment, the Cognitive Module 140 is also trained as to the Strengths 410 of each security option. For example, the Strengths 410 may include the length of time that a typical brute force attack takes to compromise data protected by each encryption standard. In such an embodiment, the Cognitive Module 140 can determine an optimized security configuration for each Data Asset 145 based in part on the Strengths 410 of each option. For example, suppose a first encryption algorithm is considered secure for up to one day, a second encryption algorithm is secure for up to one week, and a third algorithm is secure for up to one month. If a Data Asset 145 has a lifetime of 4 days, the Configuration Module 140 should select either the second or the third encryption algorithm. This determination may further be made at least in part on the Costs 415 of each algorithm.

In some embodiments, the Cognitive Module 140 continually learns about new attacks, exploits, or techniques that may affect the Strength 410 of each security configuration. For example, if a newer technique is developed that can compromise an existing encryption method in half the time, all Data Assets 145 that are associated with a Security Configuration 155 utilizing that encryption method may need to be updated. That is, in an embodiment, the Cognitive Module 140 may analyze the Metadata 150 associated with each Data Asset 145 to determine whether the new exploit will cause the Data Asset 145 to be vulnerable, and if so, the Cognitive Module 140 can generate an updated Security Configuration 155.

Figure 5:
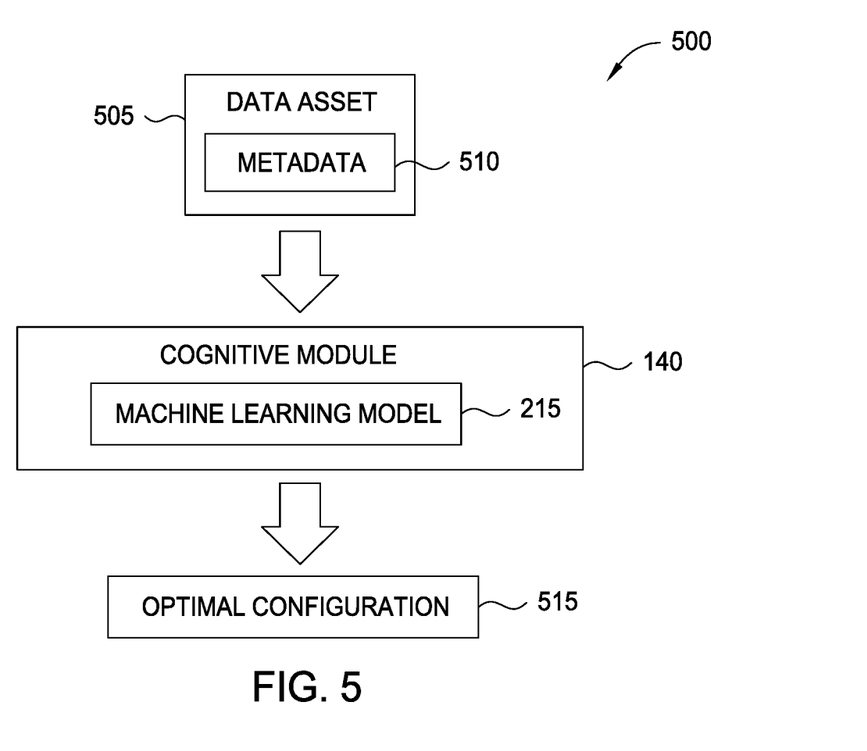
FIG. 5 illustrates a method of utilizing cognitive analysis to implement dynamic security, according to one embodiment described herein.

FIG. 5 illustrates a method 500 of utilizing cognitive analysis to implement dynamic security, according to one embodiment described herein. In the illustrated embodiment, the Cognitive Module 140 has been trained to receive a Data Asset 505 and generate an Optimal Security Configuration 515. In some embodiments, the Data Asset 505 may be associated with Metadata 510 indicating the storage location of the Data Asset 505, lifetime of the Data Asset 505, and the like. In some embodiments, as discussed above, the Cognitive Module 140 may determine the lifetime of the Data Asset 505, for example by using trained Machine Learning Model 215.

In one embodiment, the Cognitive Module 140 generates an Optimal Security Configuration 515 by processing the Metadata 510. In some embodiments, the Cognitive Module 140 does not consider the content of the Data Asset 505 at all, and the Optimal Security Configuration 515 is generated without regards to the content of the data. In various embodiments, the Optimal Security Configuration 515 may include one or more encryption requirements, access control settings, and the like. Notably, the generated Optimal Security Configuration 515 may be the same as the security configuration currently associated with the Data Asset 505 in some embodiments. Similarly, in embodiments, the generated Optimal Security Configuration 515 may be stronger than the original configuration, or may be more lenient and less stringent. That is, in an embodiment, the Cognitive Module 140 generates the Optimal Security Configuration 515 based on the associated Metadata 510, without regards for the level security (if any) that is currently applied to the Data Asset 505.

In some embodiments, the Cognitive Module 140 applies the generated Optimal Security Configuration 515 to the Data Asset 505. In some embodiments, however, the Cognitive Module 140 may provide a suggestion to use the generated Optimal Security Configuration 515, but not actually apply it until a user or administrator approves the suggestion. This may be preferable for some administrators who prefer to maintain a more active role in the security of the Computing System 105. In some embodiments, the Cognitive Module 140 applies the generated Optimal Security Configuration 515 to the Data Asset 505 if it is at least as strong as the existing security configuration, but provides a suggestion if the generated Optimal Security Configuration 515 is less stringent than the current configuration.

In some embodiments where the Cognitive Module 140 applies the generated Optimal Security Configuration 515 to the Data Asset 505 automatically, users or administrators are able to override this update. For example, the Cognitive Module 140 may provide an indication that the security configuration has been updated, and the user or administrator may reverse this change. In some embodiments, only administrators or only users with sufficient permissions may reverse the change. In one embodiment, if the user or administrator reverses the update or modifies the generated Security Configuration 515, the Cognitive Module 140 may refine its models based on this reversal or modification. For example, the Cognitive Module 140 may refine the weights of one or more machine learnings models.

Figure 6:
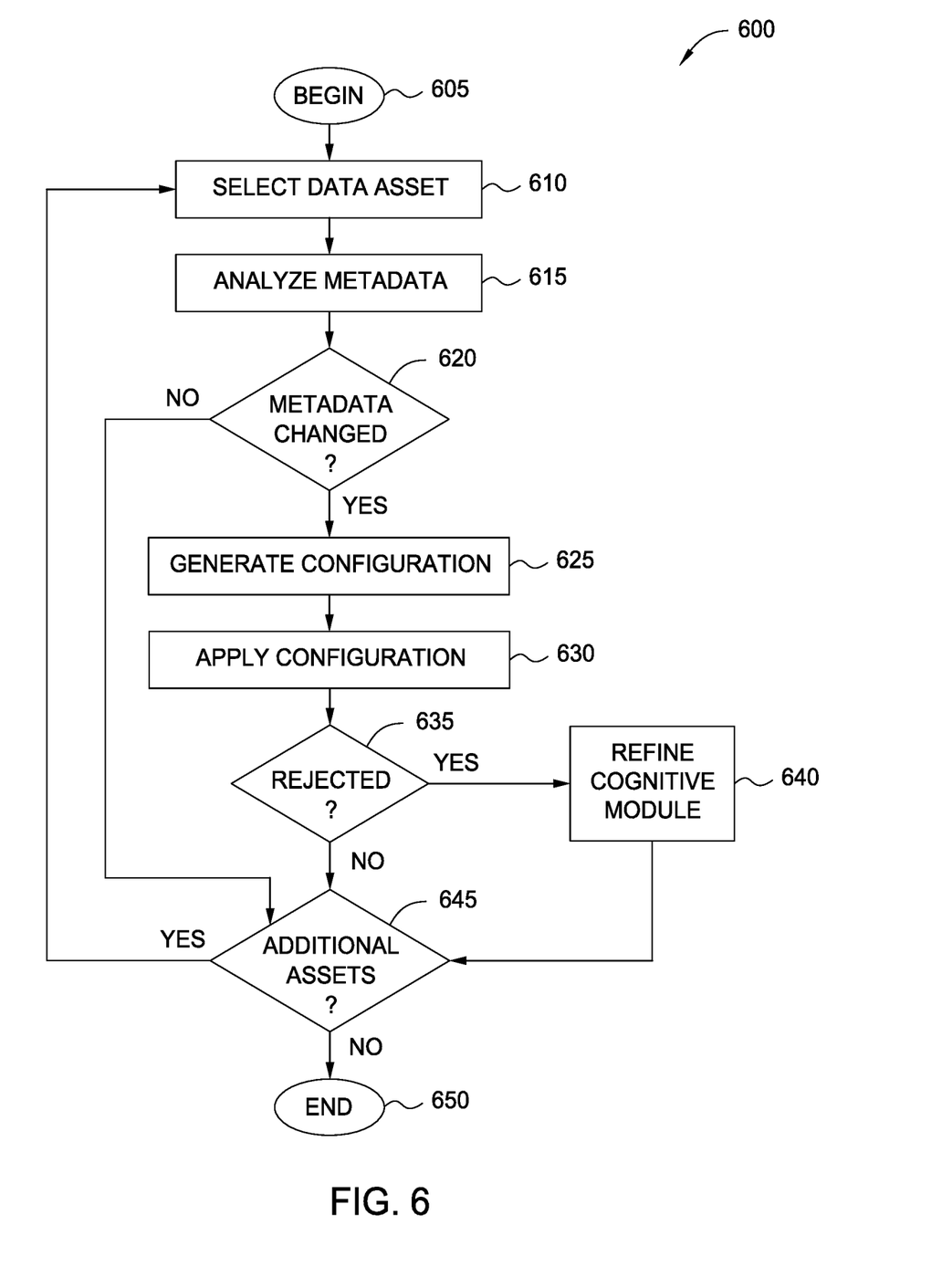
FIG. 6 is a flow diagram illustrating a method of implementing dynamic security of data, according to one embodiment described herein.

FIG. 6 is a flow diagram illustrating a method 600 of implementing dynamic security of data, according to one embodiment described herein. The method 600 begins at block 605. For example, the method 600 may begin because a user or administrator manually initiates the process. In some embodiments, the method 600 is begun periodically or according to a predefined schedule. At block 610, the Cognitive Module 140 selects a data asset to analyze. The Cognitive Module 140 may select data assets according to various methodologies. For example, in one embodiment, the Cognitive Module 140 processes all data assets on the computing system periodically (e.g., every day, every thirty minutes, and the like). In another embodiment, the Cognitive Module 140 analyzes the data assets according to a predefined schedule (e.g., at a particular time). In some embodiments, the Cognitive Module 140 analyzes subsets of data assets according to different criteria. For example, data assets associated with a high security level may be selected for analysis more frequently than data assets associated with a low security level, or vice versa.

In some embodiments, the Cognitive Module 140 periodically selects all new data assets for processing. Similarly, in some embodiments, the Cognitive Module 140 can select any data assets that have been modified since the last time the analysis was performed. Of course, any other method of selecting data assets can be used in accordance with embodiments of the present disclosure.

Once a data asset has been selected, the method 600 continues to block 615, where the Cognitive Module 140 analyzes the metadata associated with the data asset. At block 620, the Cognitive Module 140 determines whether the metadata has changed since the last time the data asset was processed by the Cognitive Module 140. In some embodiments, this determination also includes determining whether the data asset is newly created (or is a data asset in transit across the computing system), and thus has never been processed by the Cognitive Module 140. That is, if the data asset is newly created, the associated metadata will have "changed" since the prior analysis, because it did not exist during the prior analysis.

In some embodiments, the metadata may be updated whenever the underlying data asset changes. For example, if the content of the data asset changes, the metadata may be updated. Similarly, as discussed above, the metadata may include an indication of the lifetime of the data asset. If this lifetime has been changed, the metadata will also be updated. Additionally, in some embodiments, if the storage location of the data asset has changed, the metadata is likewise changed to reflect this movement. Thus, in some embodiments, the metadata of the data asset can change without the content of the data asset being modified. In one embodiment, determining whether the metadata has changed may consist of determining whether metadata that is relevant to the security configuration has changed. For example, if the only change in the metadata is the timestamp it was viewed the asset or the user who last viewed the data asset, the Cognitive Module 140 may move on to the next data asset.

If, at block 620, the Cognitive Module 140 determines that the metadata has changed, the method 600 proceeds to block 625, where the Cognitive Module 140 generates a new security configuration for the data asset. For example, as discussed above, the Cognitive Module 140 may process the metadata associated with the data asset using one or more trained machine learning models to generate an optimized security configuration that includes an appropriate level of encryption. At block 630, the Cognitive Module 140 applies the security configuration to the data asset (e.g., by associating the data asset with the configuration, by encrypting the asset, by adjusting access control settings, and the like). In some embodiments, the Cognitive Module 140 may generate and apply a security configuration for the data asset regardless of whether the associated metadata has changed or not. For example, an administrator may prefer to periodically generate updated security configurations for all data assets (or a subset of data assets) on the computing system, regardless of whether any changes are detected.

In the illustrated embodiment, the method 600 continues to block 635, where the Cognitive Module 140 determines whether the generated configuration was rejected (e.g., by a user or administrator). In an embodiment, the security configuration is considered "rejected" if it is entirely rejected or if it is modified in some respect. If so, the method 600 proceeds to block 640, where the cognitive module is refined. That is, if the generated security configuration is rejected, it may indicate that the generated configuration is too strong or too weak, or that a change was not required. Using this information, the Cognitive Module 140 can further train and refine its models in order to generate better and more optimal security configurations.

After refining of the cognitive module, the method 600 continues to block 645, where the Cognitive Module 140 checks for additional data assets that need to be processed. As illustrated, the method 600 also continues directly to this block if the generated security configuration was not rejected at block 635, and if it is determined that the metadata has not changed in block 620. If additional data assets remain, the method 600 returns to block 610 to select the next data asset. As discussed above, data assets may be selected from a subset of data assets defined according to various criteria, including type of data asset, storage location, security level, and the likes. Similarly, in some embodiments, all data assets are processed, rather than some subset. If no additional data assets remain to be processed, the method 600 proceeds to block 650, where it terminates.

Figure 7:
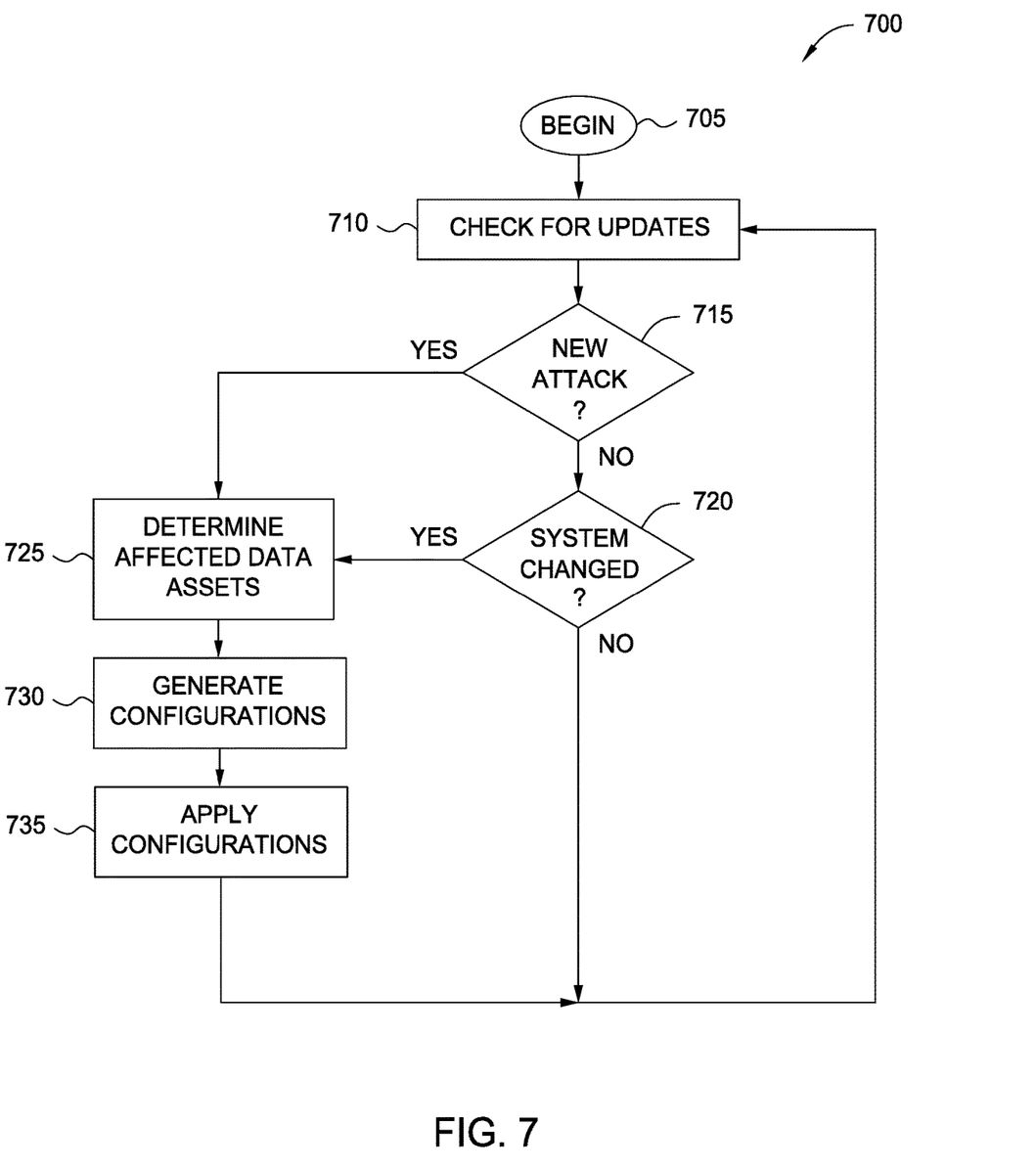
FIG. 7 is a flow diagram illustrating a method of implementing dynamic security of data, according to one embodiment described herein.

FIG. 7 is a flow diagram illustrating a method 700 of implementing dynamic security of data, according to one embodiment described herein. The method 700 begins at block 705. For example, in various embodiments, the method 700 may be triggered manually by a user, or may occur periodically or according to a predefined schedule. In some embodiments, the method 700 may begin based on receiving an indication that a new method of attack has been discovered, or a based upon determining that the computing system has changed, as will be discussed in more detail below.

At block 710, the Cognitive Module 140 checks for updates regarding security exploits and system settings. In an embodiment, the Cognitive Module 140 may poll a server or other repository to determine whether any new exploits or attacks have been discovered, developed, or announced that can be used to compromise secured data. For example, a new combination of known techniques (or new techniques) may be announced that can be used to compromise an encrypted data asset in less time than was previously possible using known methods. Similarly, new hardware may have been developed that can compromise the data assets, or existing hardware may have been assembled in a new way that leaves secured assets vulnerable.

In embodiments, the Cognitive Module 140 generally determines, at block 715, whether any new attacks or exploits might leave data assets on the computing system vulnerable to compromise. In some embodiments, any new attack or exploit may cause the method 700 to proceed to block 725, which is discussed in more detail below. In other embodiments, only new attacks or exploits that are in some manner better than existing methodologies (e.g., because they are faster, use fewer resources, and the like) cause the method 700 to proceed to block 725. If, at block 715, no new attacks are detected, the method 700 continues to block 720, where the Cognitive Module 140 determines whether the computing system has changed. For example, if a hardware component (e.g., storage or memory) or software component (e.g., a row or table in a database) is added or removed, the Cognitive Module 140 can determine at block 720 that the computing system has changed. In various embodiments, any other system changes can also be detected by the Cognitive Module 140.

If a change in the system is detected at block 720, or a new attack is identified at block 715, the method 700 proceeds to block 725. If neither a new attack nor a system change are identified, the method 700 returns to block 710 to check for updates. In various embodiments, the next check for updates may not occur immediately. Rather, in some embodiments the next check occurs after a predefined event, at a specified time, or after a predefined period of time. At block 725, the Cognitive Module 140 determines a subset of data assets on the computing system that may be affected by the detected change. For example, if a new attack was identified that reduces the strength of a particular method of encryption, the Cognitive Module 140 may select any data assets that are currently associated with a security configuration that includes that method of encryption. Similarly, if a change is detected in the system, the Cognitive Module 140 can determine which data assets are potentially affected based on their location in the file system.

After identifying the data assets that may be affected, the method 700 proceeds to block 730, where the Cognitive Module 140 generates an updated security configuration for each identified data asset. Alternatively, in some embodiments, rather than determining which data assets are affected, the Cognitive Module 140 may process all data assets on the computing system to ensure that each asset is associated with an optimal and up-to-date security configuration. In some embodiments, all potentially affected data assets are included to be re-processed (e.g., all data assets associated with the affected encryption, all assets that are reachable using a new communications pathway, etc.).

In other embodiments, however, only data assets that are actually affected are analyzed by the Cognitive Module 140 to generate updated security configurations. For example, suppose a first data asset needs to remain confidential for 24 hours, and uses an encryption algorithm that cannot be cracked in less than five days using known techniques. Further, suppose a second data asset must remain secured for three days, and is associated with a security configuration that includes the same encryption. If the newly discovered technique can break this encryption algorithm in 48 hours, the second data asset will certainly be affected by this change, because it must remain secure for three days, but the encryption currently protecting it can be breached in two. Thus, the Cognitive Module 140 will select this data asset and generate a new security configuration for it.

In some embodiments, however, the Cognitive Module 140 can recognize that the first data asset is not at risk, because the new technique reduces the protection time to two days, but the asset need only be secure for the next 24 hours. Thus, in such an embodiment, the Cognitive Module 140 will not select the first data asset for processing. In an embodiment, this reduces the processing resources required by the Cognitive Module 140. As another example, consider a third data asset protected by an access control whitelist, and a fourth data asset that is associated with an access control blacklist. If the computing system is connected to a new network or communications path, the Cognitive Module 140 may, in some embodiments, determine that only the fourth data asset is now at risk. That is, because the third data asset utilizes a whitelist, the additional network connection does not pose a risk because it will not add any new users or processes that have permission to access the asset. The fourth data asset, however, may now be accessible by additional users or applications (i.e., because the blacklist names specified entities that do not have access to the asset). Therefore, in such an embodiment, the Cognitive Module 140 may analyze metadata associated with the fourth data asset to generate an updated security configuration in response to this system change.

In embodiments, if an updated security configuration is generated by the Cognitive Module 140 for a particular data asset, the security configuration may not change, even if the security it uses is implicated in the new discovered attack or system change. For example, continuing the above example, the newly generated security configuration for the fourth data asset may be the same as the previous configuration. Similarly, although in many embodiments the updated security configuration will be more stringent, in some embodiments, the change in metadata, newly discovered attacks, or updated system topology may in fact lead to less stringent configurations. For example, if the lifetime of the data asset has gotten shorter, a less rigorous encryption can be used. Similarly, if the system change is that a network connection has been removed, the access control settings or encryption may be relaxed somewhat.

After generating the updated configuration for each data asset, the method 700 proceeds to block 735, where the Cognitive Module 140 applies the updated security configurations. The method then returns to block 710 to check for updates again. In some embodiments, the next check for updates may not occur immediately. Rather, in some embodiments the next check occurs after a predefined event, at a specified time, or after a predefined period of time.

Figure 8:
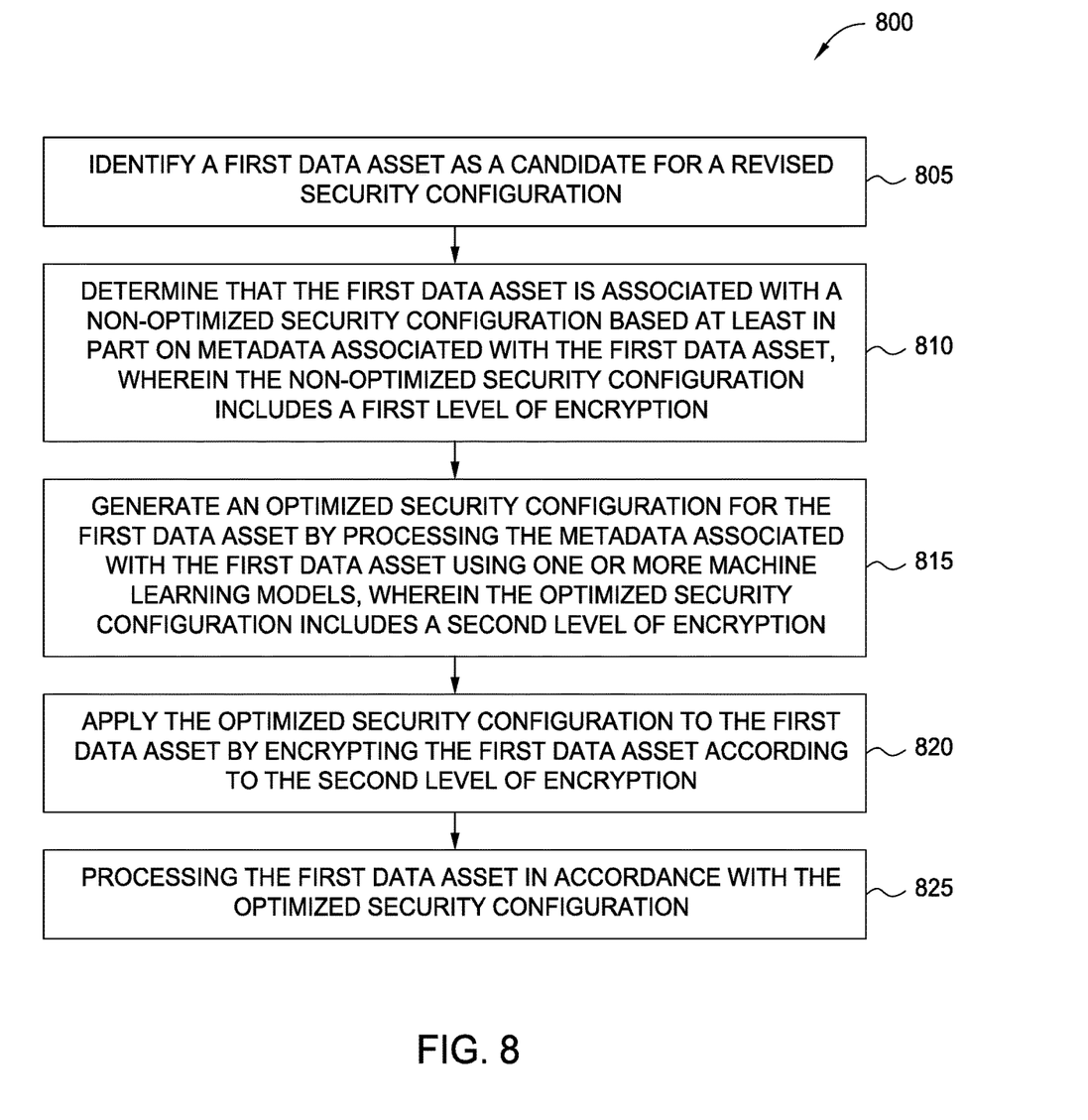
FIG. 8 is a flow diagram illustrating a method of implementing dynamic security of data, according to one embodiment described herein.

FIG. 8 is a flow diagram illustrating a method 800 of implementing dynamic security of data, according to one embodiment described herein. The method 800 begins at block 805, where the Cognitive Module 140 identifies a first data asset as a candidate for a revised security configuration. At block 810, the Cognitive Module 140 determines that the first data asset is associated with a non-optimized security configuration based at least in part on metadata associated with the first data asset, wherein the non-optimized security configuration includes a first level of encryption. The method 800 continues to block 815, where the Cognitive Module 140 generates an optimized security configuration for the first data asset by processing the metadata associated with the first data asset using one or more machine learning models, wherein the optimized security configuration includes a second level of encryption. At block 820, the optimized security configuration is applied to the first data asset by encrypting the first data asset according to the second level of encryption, and at block 825, the first data asset is processed in accordance with the optimized security configuration.

Figure 9:
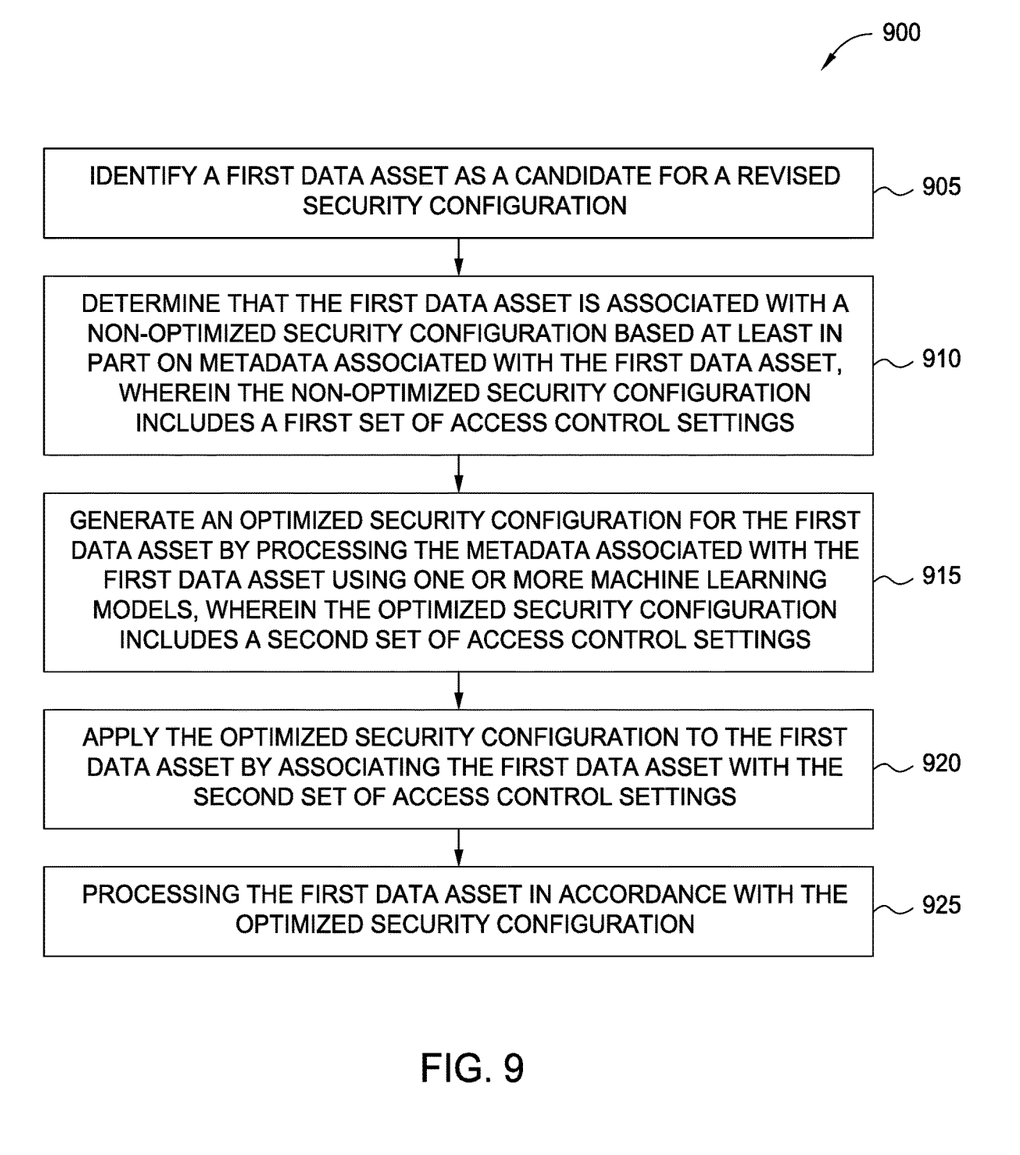
FIG. 9 is a flow diagram illustrating a method of implementing dynamic security of data, according to one embodiment described herein.

FIG. 9 is a flow diagram illustrating a method 900 of implementing dynamic security of data, according to one embodiment described herein. The method 900 begins at block 905, where the Cognitive Module 140 identifies a first data asset as a candidate for a revised security configuration. At block 910, the Cognitive Module 140 determines that the first data asset is associated with a non-optimized security configuration based at least in part on metadata associated with the first data asset, wherein the non-optimized security configuration includes a first set of access control settings. The method 900 continues to block 915, where the Cognitive Module 140 generates an optimized security configuration for the first data asset by processing the metadata associated with the first data asset using one or more machine learning models, wherein the optimized security configuration includes a second set of access control settings. At block 920, the optimized security configuration is applied to the first data asset by associating the first data asset with the second set of access control settings, and at block 925, the first data asset is processed in accordance with the optimized security configuration.

Figure 10:
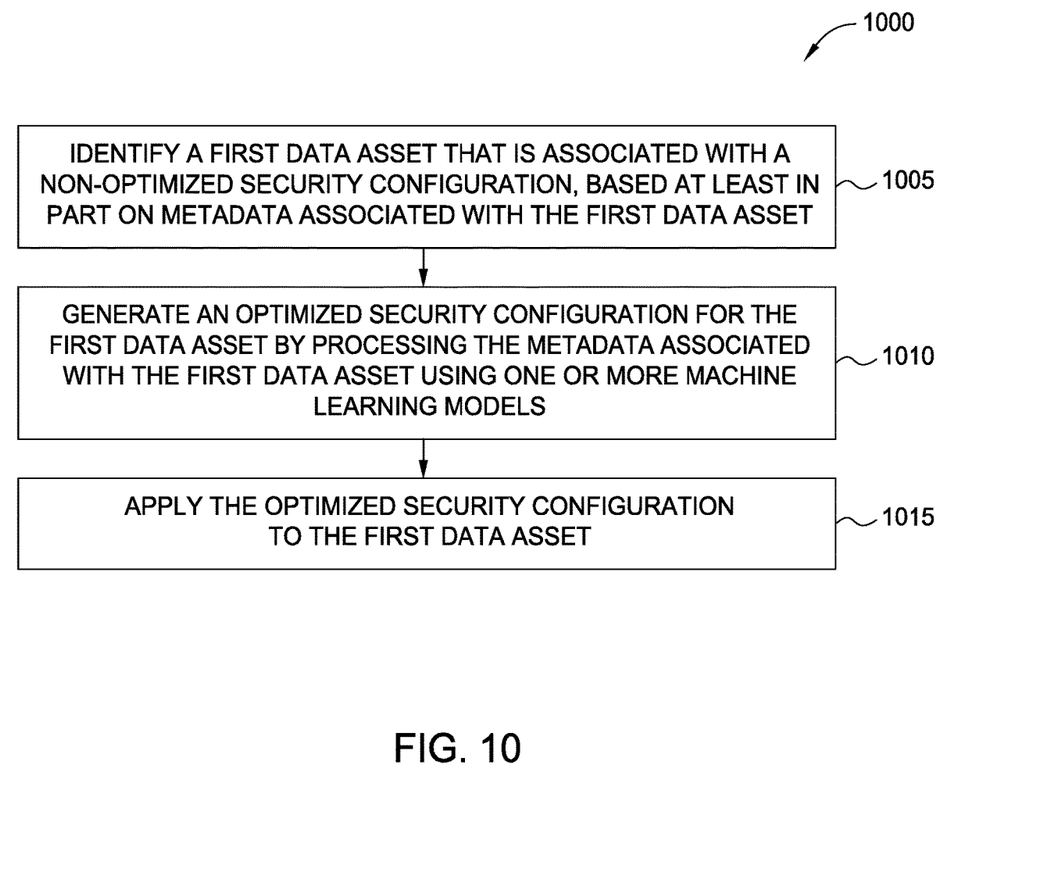
FIG. 10 is a flow diagram illustrating a method of implementing dynamic security of data, according to one embodiment described herein.

FIG. 10 is a flow diagram illustrating a method 1000 of implementing dynamic security of data, according to one embodiment described herein. The method 1000 begins at block 1005, where the Cognitive Module 140 identifies a first data asset that is associated with a non-optimized security configuration, based at least in part on metadata associated with the first data asset. At block 1010, the Cognitive Module 140 generates an optimized security configuration for the first data asset by processing the metadata associated with the first data asset using one or more machine learning models. Finally, at block 1015, the optimized security configuration is applied to the first data asset.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the Cognitive Module 140 or Machine Learning Models 215) or related data available in the cloud. For example, the Cognitive Module 140 could execute on a computing system in the cloud and generate optimal security configurations for data assets stored in the cloud or on a local machine. For example, the Cognitive Module 140 could receive metadata associated with data assets and generate optimized configurations at a location in the cloud. Doing so allows a user to access this information and application from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A computer program product comprising a non-transitory computer-readable storage medium having computer-readable program code embodied therewith, the computer-readable program code executable by one or more computer processors to perform an operation comprising:
   identifying a first data asset as a candidate for a revised security configuration;
   determining that the first data asset is associated with a non-optimized first security configuration based at least in part on metadata associated with the first data asset, wherein the non-optimized security configuration includes a first level of encryption and wherein the metadata comprises a timer indicating how long the first data asset data must remain confidential;
   generating an optimized security configuration for the first data asset by processing the metadata associated with the first data asset using one or more machine learning models, wherein the optimized security configuration includes a second level of encryption, comprising:
      determining a first amount of time needed to compromise a first encryption standard using brute force;
      determining a second amount of time needed to compromise a second encryption standard using brute force, wherein the second amount of time is greater than the first amount of time; and
      selecting the first encryption standard based on determining that the first amount of time is greater than an amount of time remaining before the timer elapses;
   applying the optimized security configuration to the first data asset; and
   upon determining that the timer has elapsed:
      determining whether an enhanced security configuration is needed for the first data asset, wherein the enhanced security configuration comprises the second encryption standard; and
      maintaining the first encryption standard if the enhanced security configuration is not needed.

2. The computer program product of claim 1, wherein identifying the first data asset comprises determining that the first data asset is a new data asset.

3. The computer program product of claim 1, wherein the metadata associated with the first data asset includes at least one of: (i) a lifetime of the first data asset, (ii) a time during which the first data asset should remain confidential; and (iii) a location of the first data asset.

4. The computer program product of claim 3, wherein the metadata associated with the first data asset comprises a lifetime indicating how long the identified data must remain confidential, and wherein the second encryption level is selected in part because it cannot be compromised using a brute force attack within the indicated lifetime.

5. The computer program product of claim 4, the method further comprising:
   determining that a newly identified type of attack could compromise the second encryption level before the indicated lifetime has passed; and
   generating a new optimized security configuration, wherein the new optimized security configuration comprises a more stringent encryption level.

6. The computer program product of claim 1, wherein the first encryption level is more secure than the second encryption level.

7. A system comprising:
   a processor; and
   a memory storing one or more instructions which, when executed by the processor, performs an operation comprising:
      identifying a first data asset as a candidate for a revised security configuration;
      determining that the first data asset is associated with a non-optimized security configuration based at least in part on metadata associated with the first data asset, wherein the non-optimized security configuration includes a first set of access control settings and wherein the metadata comprises a timer indicating how long the first data asset data must remain confidential;
      generating an optimized security configuration for the first data asset by processing the metadata associated with the first data asset using one or more machine learning models, wherein the optimized security configuration includes a second set of access control settings, comprising:
         determining a first amount of time needed to compromise a first encryption standard using brute force;
         determining a second amount of time needed to compromise a second encryption standard using brute force, wherein the second amount of time is greater than the first amount of time; and
         selecting the first encryption standard based on determining that the first amount of time is greater than an amount of time remaining before the timer elapses;
      applying the optimized security configuration to the first data asset; and
      upon determining that the timer has elapsed:
         determining whether an enhanced security configuration is needed for the first data asset, wherein the enhanced security configuration comprises the second encryption standard; and
         maintaining the first encryption standard if the enhanced security configuration is not needed.

8. The system of claim 7, wherein identifying the first data asset comprises determining that the first data asset is a new data asset.

9. The system of claim 7, wherein the metadata associated with the first data asset includes at least one of: (i) a lifetime of the first data asset, (ii) a time during which the first data asset should remain confidential; and (iii) a location of the first data asset.

10. The system of claim 9, wherein the metadata associated with the first data asset comprises a lifetime indicating how long the identified data must remain confidential, and wherein the second encryption level is selected in part because it cannot be compromised using a brute force attack within the indicated lifetime.

11. The system of claim 7, wherein the second set of access control settings is more permissive than the first set of access control settings.

12. A method comprising:
 identifying a first data asset that is associated with a non-optimized first security configuration, based at least in part on metadata associated with the first data asset, wherein the metadata comprises a timer indicating how long the first data asset data must remain confidential;
 generating an optimized security configuration for the first data asset by processing the metadata associated with the first data asset using one or more machine learning models, comprising:
  determining a first amount of time needed to compromise a first encryption standard using brute force;
  determining a second amount of time needed to compromise a second encryption standard using brute force, wherein the second amount of time is greater than the first amount of time; and
  selecting the first encryption standard based on determining that the first amount of time is greater than an amount of time remaining before the timer elapses;
 applying the optimized security configuration to the first data asset;
 upon determining that the timer has elapsed:
  determining whether an enhanced security configuration is needed for the first data asset, wherein the enhanced security configuration comprises the second encryption standard; and
  maintaining the first encryption standard if the enhanced security configuration is not needed.

13. The method of claim 12, wherein identifying the first data asset comprises determining that the first data asset is a new data asset.

14. The method of claim 12, wherein identifying the first data asset comprises determining that the first data asset has changed.

15. The method of claim 12, wherein the optimized security configuration comprises at least one of: (i) access control restrictions and (ii) encryption standards.

16. The method of claim 12, wherein the metadata associated with the first data asset includes at least one of: (i) a lifetime of the first data asset, (ii) a time during which the first data asset should remain confidential; and (iii) a location of the first data asset.

17. The method of claim 12, wherein prior to processing the metadata with the one or more machine learning models, the first data asset is associated with a first security configuration, wherein the optimized security configuration is more stringent than the first security configuration.

18. The method of claim 12, wherein prior to processing the metadata with the one or more machine learning models, the first data asset is associated with a first security configuration, wherein the optimized security configuration is less stringent than the first security configuration.

19. The method of claim 12, further comprising:
 determining that the timer has elapsed; and
 generating a new optimized security configuration for the first data asset, wherein the new optimized security configuration comprises a weaker encryption standard.

20. The method of claim 12, the method further comprising:
 determining, before the timer elapses, that a newly identified type of attack could compromise the first encryption standard before the timer elapses; and
 generating a new optimized security configuration, wherein the new optimized security configuration comprises a more stringent encryption standard.

* * * * *